(12) United States Patent
Hwang et al.

(10) Patent No.: US 9,706,370 B2
(45) Date of Patent: Jul. 11, 2017

(54) METHOD AND DEVICE FOR MANAGING BACKUP CHANNELS FOR COGNITIVE RADIO COMMUNICATION

(71) Applicant: Electronics and Telecommunications Research Institute, Daejeon (KR)

(72) Inventors: Sung Hyun Hwang, Daejeon (KR); Byung Jang Jeong, Daejeon (KR); Gwang Zeen Ko, Daejeon (KR); Frangklin A Antony, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/394,416

(22) PCT Filed: Apr. 16, 2013

(86) PCT No.: PCT/KR2013/003163
§ 371 (c)(1),
(2) Date: Oct. 14, 2014

(87) PCT Pub. No.: WO2013/157800
PCT Pub. Date: Oct. 24, 2013

(65) Prior Publication Data
US 2015/0072700 A1    Mar. 12, 2015

(30) Foreign Application Priority Data

Apr. 16, 2012 (KR) .................. 10-2012-0038945
Apr. 15, 2013 (KR) .................. 10-2013-0041149

(51) Int. Cl.
*H04W 72/00* (2009.01)
*H04W 4/06* (2009.01)
*H04W 72/04* (2009.01)

(52) U.S. Cl.
CPC ............ *H04W 4/06* (2013.01); *H04W 72/048* (2013.01)

(58) Field of Classification Search
USPC ....................................... 455/452.1
See application file for complete search history.

(56) References Cited

U.S. PATENT DOCUMENTS

| | | | |
|---|---|---|---|
| 2009/0190537 A1* | 7/2009 | Hwang et al. ............... 370/329 |
| 2010/0220686 A1 | 9/2010 | Glick et al. | |
| 2010/0271948 A1* | 10/2010 | Challapali et al. .......... 370/235 |
| 2011/0258214 A1* | 10/2011 | Shu ..................... H04L 41/0893 707/769 |
| 2011/0312330 A1* | 12/2011 | Sadek ................... H04W 16/14 455/452.2 |
| 2012/0071189 A1 | 3/2012 | Mody | |

(Continued)

FOREIGN PATENT DOCUMENTS

KR    1020100007675 A    1/2010
KR    1020100021996 A    2/2010

(Continued)

*Primary Examiner* — Tanmay Shah
(74) *Attorney, Agent, or Firm* — William Park & Associates Ltd.

(57) ABSTRACT

Provided is an apparatus and method for managing a backup channel for cognitive radio communication that may group at least one device included in a cell served by a base station, and allocate backup channels for cognitive radio communication to the groups, based on location information and mobility of the groups.

14 Claims, 6 Drawing Sheets

(56) References Cited

U.S. PATENT DOCUMENTS

| | | | | |
|---|---|---|---|---|
| 2012/0115498 | A1* | 5/2012 | Kim et al. | 455/452.2 |
| 2013/0208701 | A1* | 8/2013 | Cho et al. | 370/331 |
| 2013/0215860 | A1* | 8/2013 | Cho | H04B 7/026 |
| | | | | 370/329 |
| 2013/0329626 | A1* | 12/2013 | Sohn et al. | 370/312 |
| 2014/0127991 | A1* | 5/2014 | Lim | H04W 76/023 |
| | | | | 455/39 |

FOREIGN PATENT DOCUMENTS

| | | |
|---|---|---|
| KR | 1020100106454 A | 10/2010 |
| KR | 1020110030507 A | 3/2011 |
| KR | 1020120012829 A | 2/2012 |
| KR | 1020120029912 A | 3/2012 |
| WO | 2008051264 A1 | 5/2008 |

* cited by examiner

FIG. 5

| PARAMETER | NOTE |
|---|---|
| TYPE OF GROUP (TOG) OR TYPE OF HUB-DEVICE (TOH) | FIXED GROUP : 0 MOBILE GROUP : 1 |
| LOCATION OF GROUP (LOG) | LATITUDE LONGITUDE |
| DEVICE IDENTIFIER (DID) | DEPENDING ON THE NUMBER OF DEVICES UNDER THE CONTROL OF A BS |
| GROUP IDENTIFIER (GID) | DEPENDING ON THE NUMBER OF GROUPS UNDER THE CONTROL OF A BS |

510
520
530
540

METHOD AND DEVICE FOR MANAGING BACKUP CHANNELS FOR COGNITIVE RADIO COMMUNICATION

TECHNICAL FIELD

The present invention relates to an apparatus and method for managing a backup channel for cognitive radio communication that may effectively manage an idle frequency in a cognitive radio communication system that shares frequency resources.

BACKGROUND ART

In a communication network, for example, a machine to machine (M2M) to network, in which a number of devices transmit and receive a small quantity of data, overhead may increase when resources are allocated to all individual devices. When the resources are allocated at random, it may be difficult to guarantee a satisfactory quality of service (QoS). Accordingly, in general, management of backup channels may be performed in a manner in which all devices in a cell under the control of a base station (BS) may share an identical backup channel, and operating channels of all devices in a cell may be switched collectively to a predetermined backup channel when a licensed user or incumbent appears.

DISCLOSURE OF INVENTION

Technical Goals

An aspect of the present invention provides a method and apparatus that may prevent frequent occurrences of channel switching due to overlapping between groups caused by an appearance of a new device or group and a change in a location caused by movement of devices in a cognitive radio communication system.

Another aspect of the present invention provides a method and apparatus that may reduce a decrease in a quality of service (QoS) and an increase of overhead caused by complex resource management and frequent channel switching.

Technical Solutions

According to an aspect of the present invention, there is provided a method of managing a backup channel for cognitive radio communication, the method including grouping at least one device included in a cell served by a base station, and allocating backup channels for cognition radio communication to the groups, based on mobility and location information of the groups.

Group types of the groups may be determined to be one of a fixed group without mobility and a mobile group with mobility, based on whether the groups have mobility.

The allocating may include allocating a backup channel to a target group performing cognitive radio communication, among the groups, based on the mobility and location information of the groups.

The allocating may include allocating backup channels for cognitive radio communication to the target group and another group, among the groups, based on at least one of group types of the target group and the other group, and whether the target to group and the other group overlap.

The method may further include allocating an identical backup channel to the target group and the other group, when group types of the target group and the other group correspond to a fixed group.

The method may further include allocating different backup channels to the target group and the other group, when group types of the target group and the other group correspond to a fixed group, and a location of the target group and a location of the other group overlap.

The method may further include allocating an identical backup channel to the target group and the other group, when at least one of a group type of the target group and a group type of the other group corresponds to a mobile group, and a location of the target group and a location of the other group do not overlap.

The method may further include allocating different backup channels to the target group and the other group, when at least one of a group type of the target group and a group type of the other group corresponds to a mobile group.

The allocating may include determining whether an idle channel yet to be allocated to the groups is present, and allocating an idle channel to the target group, when the idle channel is present.

The method may further include determining whether a backup channel allocated to a fixed group, among the groups, is present, when an idle channel is absent, and allocating, to the target group, a backup channel allocated to the fixed group, when the backup channel allocated to the fixed group is present, and a location of the fixed group and a location of another group, among the groups, do not overlap.

The method may further include, in a case in which a backup channel allocated to the fixed group is absent, or in a case in which the location of the fixed group and the location of the target group overlap, allocating, to the target group, a backup channel allocated to a mobile group, when the backup channel allocated to the mobile group, among the groups, is present, and a location of the mobile group and the location of the target group do not overlap.

The method may further include allocating, to the target group, a backup channel allocated to the fixed group or the mobile group, when the location of the mobile group or the location of the fixed group overlaps the location of the target group to although the backup channel allocated to the fixed group and the mobile group, among the groups, is present.

The method may further include allocating, to the target group, a backup channel allocated to the base station, when a backup channel allocated to the mobile group is absent.

The method may further include updating information about backup channels allocated to the groups, when a location of the mobile group is changed or when at least one new group appears in the cell, such that overlapping occurs with respect to the backup channel.

The devices may exchange a management message for managing the backup channels, and the management message may include at least one of a group identifier (GID) to identify groups served by the base station, a device identifier (DID) for identifying the devices, a location of group (LOG) to which the devices belong, and a type of group (TOG) indicating whether the group has mobility.

According to an aspect of the present invention, there is provided an apparatus for managing a backup channel for cognition radio communication, the apparatus including a grouping unit to group at least one device included in a cell served by a base station, and an allocation unit to allocate backup channels for cognition radio communication to the groups, based on mobility and location information of the groups.

Group types of the groups may be determined to be one of a fixed group without mobility and a mobile group with mobility, based on whether the groups have mobility.

The allocation unit may allocate backup channels for cognitive radio communication to a target group performing cognitive radio communication and another group, among the groups, based on at least one of group types of the target group and the other group, and whether a location of the target group and a location of the other group overlap.

Advantageous Effects of the Invention

According to an aspect of the present invention, it is possible to reduce a frequency of channel switching occurring due to an appearance of a new device or group and a change in a location caused by movement of devices in a cognitive radio communication system.

According to another aspect of the present invention, it is possible to reduce a decrease in a quality of service (QoS) and an increase of overhead caused by complex resource management, by grouping devices and managing the devices on a group basis.

BRIEF DESCRIPTION OF DRAWINGS

FIG. 5 is a table illustrating a management message to be used for managing a backup channel of a group by a method of managing a backup channel for cognitive radio communication according to an embodiment.

BEST MODE FOR CARRYING OUT THE INVENTION

Figure 1:
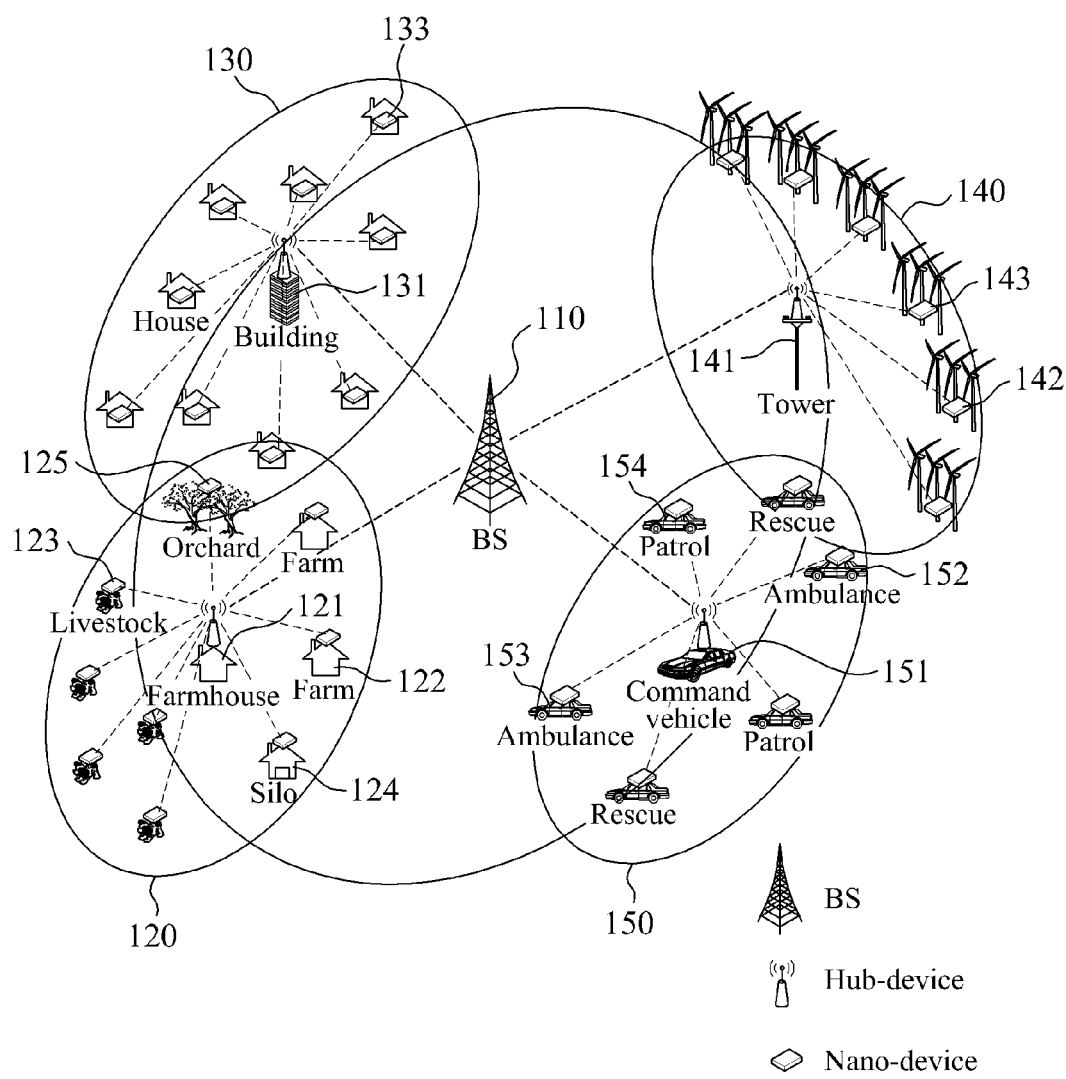
FIG. 1 is a diagram illustrating a network environment in which a method of managing a backup channel for cognitive radio communication is performed according to an embodiment.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a network environment in which a method of managing a backup channel for cognitive radio communication is performed according to an embodiment.

Referring to FIG. 1, a plurality of devices is included in a plurality of cells served by a base station (BS). The plurality of devices is grouped into a plurality of groups, by the method according to the present embodiment. In the present embodiment, a backup channel may be allocated to each group to which respective devices belong. Devices belonging to a group may compete with one another for a backup channel allocated to the corresponding group.

Here, the "backup channel" refers to a radio resource or a candidate channel to be selected as a subsequent operating channel when a licensed user appears in an operating channel being used for radio communication or a radio communication system.

Devices belonging to each group may be divided into a hub-device and a nono-device, according to roles to be performed. A hub-device may control a number of nano-devices in a group. Nano-devices being connected to a hub-device may belong to an identical group.

The hub-device may access a cognitive radio database directly to retrieve database information ('Mode II device'), or may access another device to retrieve database information ('Mode I device'). In contrast, a nano-device may access another device to retrieve database information, at all times.

Although devices included in a single group may have an identical group identifier (Group ID; GID), the devices may have different connection identifiers (connection IDs; CIDs).

In general, a group may include a single hub-device, and a plurality of nano-devices. The group may be classified as a fixed device group or a fixed group, or a mobile device group or a mobile group, depending on mobility of the hub-device.

The fixed group may include a fixed hub-device, and the mobile group may include a mobile hub-device. For example, fixed nano-devices included in a fixed group may be installed in a house 133, wind turbines 142 and 143, and the like. Mobile nano-devices included in a fixed group may be installed on livestock 123, and the like. In contrast, mobile nano-devices included in a mobile group 150 may be installed in ambulances 152 and 153, a patrol car 154, boats, and the like.

At least one group may be present in a cell under the control of a BS 110. Each group may operate like a small-size cell. In this instance, a hub-device may provide a function of a small-size BS in a corresponding small-size cell.

In the present embodiment, a backup channel of each group may be managed using location information and mobility of the corresponding group or a hub-device. In a case in which a backup channel of each group is determined in view of a mobility relationship with another group, three possible combinations of groups may include a combination of a fixed group and a fixed group, a combination of a fixed group and a mobile group, and a combination of a mobile group and a mobile group.

In a relationship between a fixed group and a fixed group, basically, an identical backup channel may be allocated to each group. However, when the two groups overlap in terms of location information of each group, different backup channels may be allocated to avoid interference between the two groups.

In a relationship between a fixed group and a mobile group, and a relationship between a mobile group and a mobile group, a different backup channel may be allocated to each group. However, when the two groups do not overlap in terms of location information, the BS 110 may allocate an identical backup channel to the groups, for frequency reuse.

When a possibility in which groups newly overlap due to an internal change, for example, an appearance of a new group, or a change in a location of a mobile group is sensed, or when an external change, for example, an appearance of a new licensed user, is sensed, backup channel information of each group may be updated.

In FIG. 1, three fixed groups, for example, a first fixed group 120, a second fixed group 130, and a third fixed group 140, and a single mobile group, for example, the mobile group 150, are connected to the BS 110. The BS 110 may serve devices 121, 122, 123, 124, 125, 131, 133, 141, 142, 143, 151, 152, and 153 belonging to and connected via a wireless interface to respective groups, for example, the first fixed group 120, the second fixed group 130, the third fixed group 140, and the mobile group 150.

For example, the first fixed group 120 may include a farmhouse, the second fixed group 130 may include a village, and the third fixed group 140 may include wind turbines. The mobile group 150 may include automobiles, boats, and the like.

In a relationship between the first fixed group 120 and the second fixed group 130, hub-devices of the first fixed group 120 and the second fixed group 130 may be installed and fixed in a farmhouse 121 and a building 131, respectively. Accordingly, the BS 110 may allocate an identical backup channel to the first fixed group 120 and the second fixed group 130. However, since a location of the first fixed group 120 and a location of the second fixed group 120 overlap, the BS 110 may allocate different backup channels, for example, Channel No. 2 and Channel No. 3, to the first fixed group 120 and the second fixed group 130, respectively.

In a relationship between the first fixed group 120 and the third fixed group 140, hub-devices of the first fixed group 120 and the third fixed group 140 may be installed and fixed in the farmhouse 121 and a tower 140, respectively. Since a location of the first fixed group 120 and a location of the third fixed group 140 do not overlap, the BS 110 may allocate an identical channel, for example, Channel No. 2, to the first fixed group 120 and the third fixed group 140.

In a relationship between the third fixed group 140 and the mobile group 150, since the third fixed group 140 and the mobile group 150 overlap, the BS 110 may allocate different backup channels, Channel No. 2 and Channel No. 3, to the third fixed group 140 and the mobile group 150, respectively. In a relationship between the second fixed group 130 and the mobile group 150, the BS 110 may allocate different backup channels to the second fixed group 130 and the mobile group 150, respectively. However, since the second fixed group 130 and the mobile group 150 do not overlap, the BS 110 may allocate an identical backup channel, for example, Channel No. 3, to the second fixed group 130 and the mobile group 150, depending on an availability of an idle frequency.

Hereinafter, a method of managing a backup channel for cognitive radio communication will be described through various embodiments.

Figure 2:
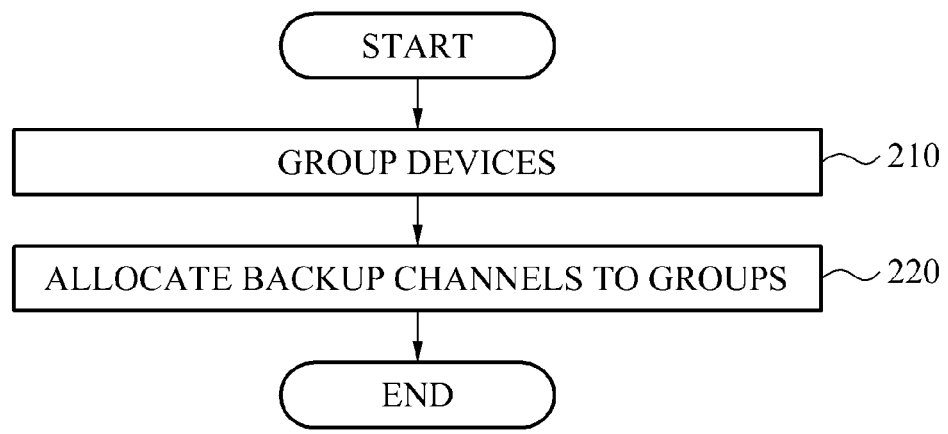
FIG. 2 is a flowchart illustrating a method of managing a backup channel for cognitive radio communication according to an embodiment.

FIG. 2 is a flowchart illustrating a method of managing a backup channel for cognitive radio communication according to an embodiment. Hereinafter, a management apparatus may be a BS, or a separate apparatus other than a BS.

Referring to FIG. 2, in operation 210, an apparatus for managing a backup channel for cognitive radio communication, hereinafter referred to as the "management apparatus", may group at least one device included in a cell served by a BS.

Group types of the groups grouped in operation 210 may be determined based on whether the groups have mobility. For example, when a group has mobility, a group type of the corresponding group may be determined to be a mobile group. When a group does not have mobility, a group type of the corresponding group may be determined to be a fixed group.

Whether the corresponding group has mobility may be determined based on whether a hub-device included in the corresponding group has mobility. For example, among the hub-devices 121, 131, 141, and 151 of FIG. 1, only the hub-device 151 has to mobility since the hub-device 151 is installed in a command vehicle having mobility. The remaining hub-devices 121, 131, and 141 do not have mobility since the hub-devices 121, 131, and 141 are installed in fixed objects, for example, a farmhouse, a building, and a tower, respectively. Accordingly, a group including the mobile hub-device 151 may be determined to be a mobile group, and groups including the fixed hub-devices 121, 131, and 141 may be determined to be fixed groups.

In operation 220, the management apparatus may allocate backup channels for cognitive radio communication to the groups, based on location information and mobility of the groups grouped in operation 210. In operation 220, the management group may allocate a backup channel to a target group performing cognitive radio communication, among the groups, based on the location information and the mobility of the groups. In addition, the management group may allocate backup channels for cognitive radio communication to the target group and another group, based on at least one of 1) group types of the target group and the other group, and 2) whether the target group and the other group overlap.

Figure 3:
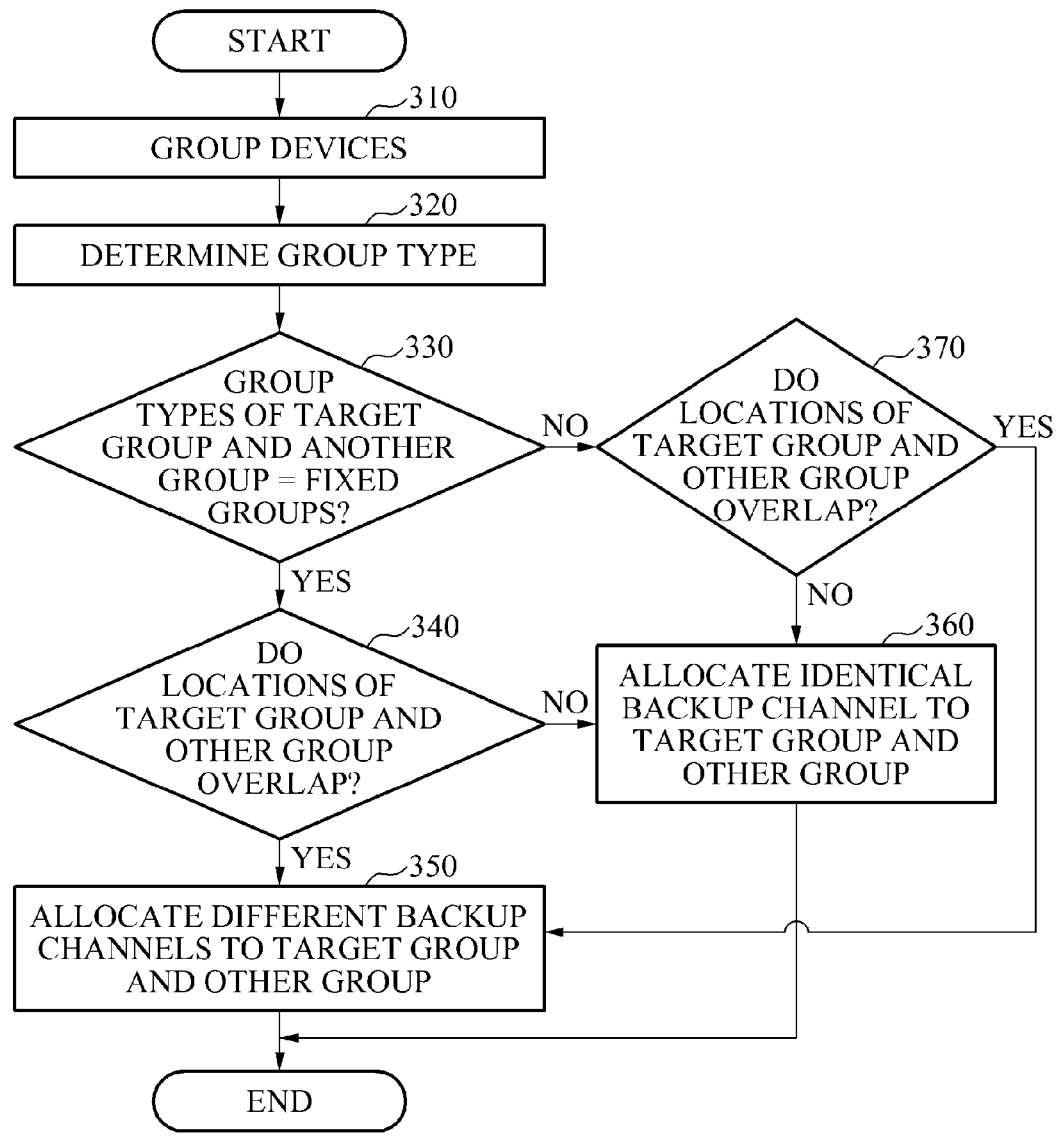
FIG. 3 is a flowchart illustrating a method of managing a backup channel for cognitive radio communication according to another embodiment.

FIG. 3 is a flowchart illustrating a method of managing a backup channel for cognitive radio communication according to another embodiment.

Referring to FIG. 3, in operation 310, a management apparatus may group at least one device included in a cell served by a BS. In operation 320, the management apparatus may determine a group type of each of the grouped groups.

The management apparatus may allocate backup channels for cognitive radio communication to the groups, for example, a target group and another group, based on at least one of group types of the groups, and whether the target group and the other group overlap. As described above, the group types of the groups may be determined based on mobility of the groups or hub-devices included in the respective groups.

In particular, in operation 330, the management apparatus may determine whether group types of both the target group and the other group correspond to a fixed group.

When it is determined in operation 330 that the group types of both the target group and the other group correspond to a fixed group, the management apparatus may determine whether a location of the target group and a location of the other group overlap, in operation 340.

When it is determined in operation 340 that the location of the target group and the location of the other group overlap, the management apparatus may allocate different backup channels to the target group and the other group, in operation 350. Conversely, when it is determined in operation 340 that the location of the target group and the location of the other group do not overlap, the management apparatus may allocate an identical backup channel to the target group and the other group, in operation 360.

When it is determined in operation 330 that none of the group types of the target group and the other group correspond to a fixed group, the management apparatus may determine whether a location of the target group and a location of the other group overlap, in operation 370. For example, a case in which none of the group types of the target group and the other group correspond to a fixed group may include a case in which at least one of the group type of the target group and the group type of the other group corresponds to a mobile group.

When it is determined in operation 370 that the location of the target group and the location of the other group overlap, the management apparatus may allocate different backup channels to the target group and the other group, in operation 350. When at least one of the group type of the target group and the group type of the other group corresponds to the mobile group, and the location of the target group and the location of the other group overlap, the management apparatus may allocate different backup channels to the target group and the other group.

Conversely, when it is determined in operation 370 that the location of the target group and the location of the other group do not overlap, the management apparatus may allocate an identical backup channel to the target group and the other group, in operation 360.

Hereinafter, a backup channel to be allocated to a target group will be described in detail with reference to FIG. 4.

Figure 4:
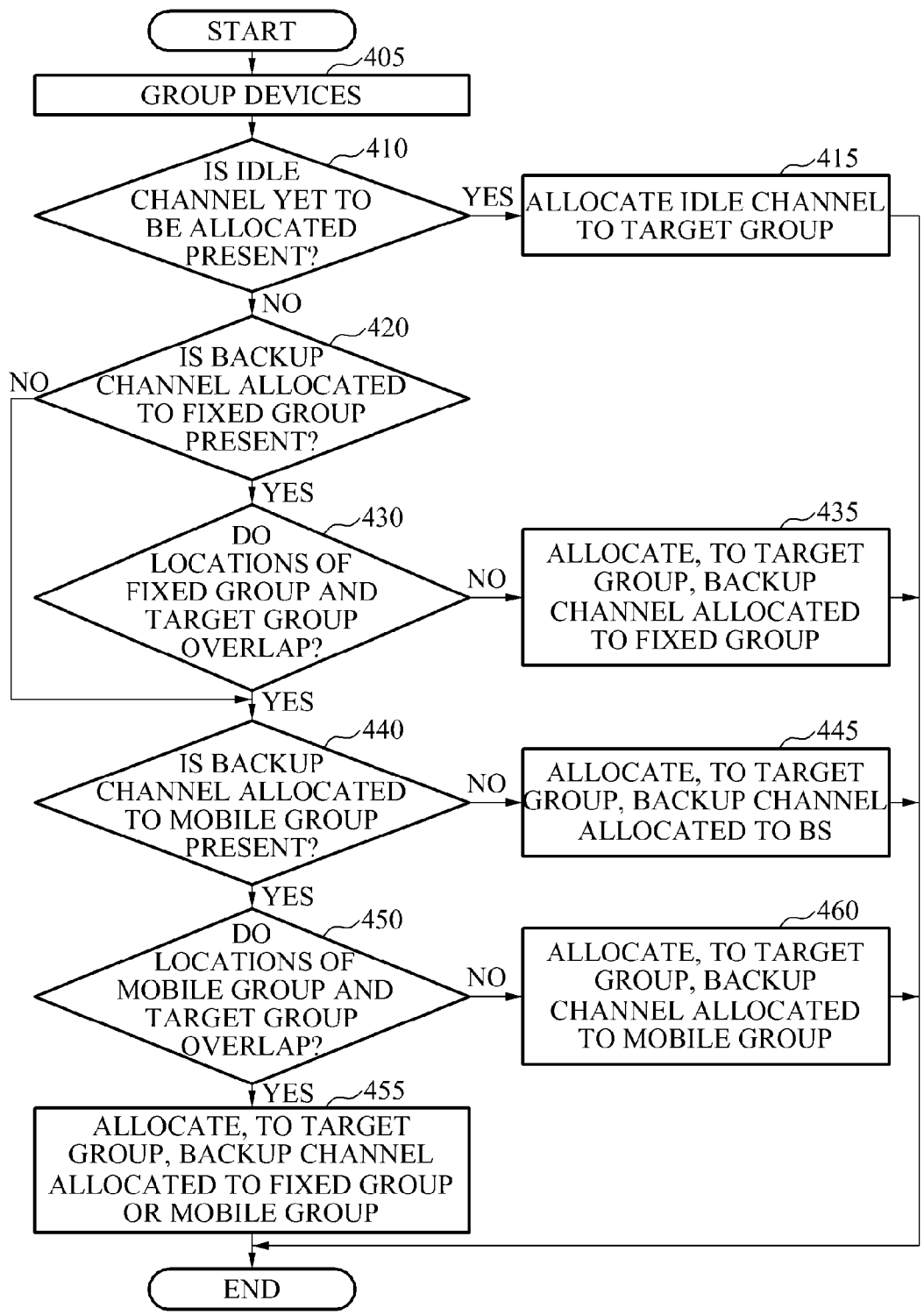
FIG. 4 is a flowchart illustrating a method of managing a backup channel for cognitive radio communication according to still another embodiment.

FIG. 4 is a flowchart illustrating a method of managing a backup channel for cognitive radio communication according to still another embodiment.

Referring to FIG. 4, in operation 405, a management apparatus may group at least one device included in a cell served by a BS. The management apparatus may allocate backup channels for cognitive radio communication to the groups, based on to location information and mobility of the groups grouped in operation 405.

In particular, when a white space yet to be allocated to another group is present, the management apparatus may allocate the white space to a target group. The "white space" refers to an idle frequency or an idle channel not being used by a licensed user.

In operation 410, the management apparatus may determine whether an idle channel yet to be allocated to the groups is present. When it is determined that an idle channel is present, in operation 410, the management apparatus may allocate the idle channel to the target group, in operation 415.

Conversely, when it is determined in operation 410 that an idle channel is absent, the management apparatus may determine whether a backup channel allocated to a fixed group, among the groups, is present, in operation 420. A presence of a backup channel allocated to the fixed group may be verified first since a burden of switching channels may exist when a state of a backup channel being currently allocated to a mobile group is changed to an unavailable backup channel, due to mobility of the mobile group, although it is determined that the allocated backup channel is available.

Accordingly, when a backup channel allocated to the fixed group is present, and the target group and the fixed group do not overlap, the management apparatus may allocate, to the target group, the backup channel allocated to the fixed group.

When it is determined in operation 420 that a backup channel allocated to the fixed group is present, the management apparatus may determine whether a location of the fixed group and a location of the target group overlap, in operation 430. When it is determined in operation 430 that the location of the target group and the location of the fixed group do not overlap, the management apparatus may allocate, to the target group, the backup channel allocated to the fixed group, in operation 435.

When it is determined in operation 420 that a backup channel allocated to the fixed group is absent, the management apparatus may perform operation 440 to determine whether a backup channel allocated to a mobile group is present.

When it is determined in operation 430 that the location of the fixed group and the location of the target group overlap, the management apparatus may determine whether a backup channel allocated to the mobile group is present, in operation 440. When it is determined in operation 440 that a backup channel allocated to the mobile group is absent, the management apparatus may allocate, to the target group, a backup channel allocated to the BS, in operation 445.

Conversely, when it is determined in operation 440 that a backup channel allocated to the mobile group is present, the management apparatus may determine whether a location of the mobile group and the location of the target group overlap, in operation 450. When the mobile group and the target group overlap although a backup channel allocated to the mobile group is present, the management apparatus may allocate, to the target group, a backup channel allocated to another fixed group or another mobile group for use, in operation 455.

When the location of the mobile group or the location of the fixed group overlaps the location of the target group although the backup channel allocated to the fixed group and the mobile group, among the groups, is present, the management apparatus may allocate, to the target group, the backup channel allocated to the fixed group or the mobile group.

In this instance, when channel switching occurs such that the backup channel allocated to the target group is used as an operating channel for at least two overlapping groups, the management apparatus may use a mechanism for proper sharing of resources between groups. Accordingly, when no backup channel is allocated to the fixed group and the mobile group, the BS may determine that a backup channel allocable to the target group is absent, and allocate, to the target group, the backup channel allocated to the BS.

In addition, when channel switching occurs such that the BS and the target group share a backup channel as a new operating channel, the BS may perform a mechanism for proper sharing of resources between devices belonging to a group and devices not belonging to a group.

The groups operating in such an environment may provide an effect of resolving a radio shadow area, rather than an effect of frequency reuse. The method of managing a backup channel according to an embodiment may be changed slightly, depending on a peripheral environment or mobility of the target group.

When it is determined in operation 450 that the location of the mobile group and the location of the target group do not overlap, the management apparatus may allocate, to the target group, a backup channel allocated to the mobile group, in operation 460.

FIG. 5 is a table illustrating a management message to be used for managing a backup channel of a group by a method of managing a backup channel for cognitive radio communication according to an embodiment.

Referring to FIG. 5, the management message may be used for managing a backup channel of a group. For example, the management message may include, as a parameter, at least one of a type of group (TOG) 510, a location of group (LOG) 520, a device identifier (DID) 530, and a group identifier (GID) 540.

The TOG 510 may indicate whether a group has mobility, and may be determined based on whether a hub-device included in the group has mobility. The TOG 510 may be replaced with a type of hub-device (TOH). For example, when a group corresponds to a fixed group, the TOG 510 may indicate a value of a corresponding bit as "0". When a group corresponds to a mobile group, the TOG 510 may indicate a value of the corresponding bit as "1".

The LOG 520 may include location information of a group, and may indicate information, for example, a longitude and a latitude of a region in which the group is located.

The LOG 520 may be expressed, for example, by a latitude and a longitude. The location information of the group may be determined based on location information of a hub-device.

The DID 530 may refer to an identifier (ID) to be used for identifying each device. A number of bits of the DID may be determined based on a total number of devices belonging to a cell under the control of a BS.

The GID 540 may refer to an ID to be used for identifying each group being connected to the BS, in particularly, served by the BS. A number of bits of the GID 540 may be determined based on a total number of groups being connected to the BS.

Figure 6:
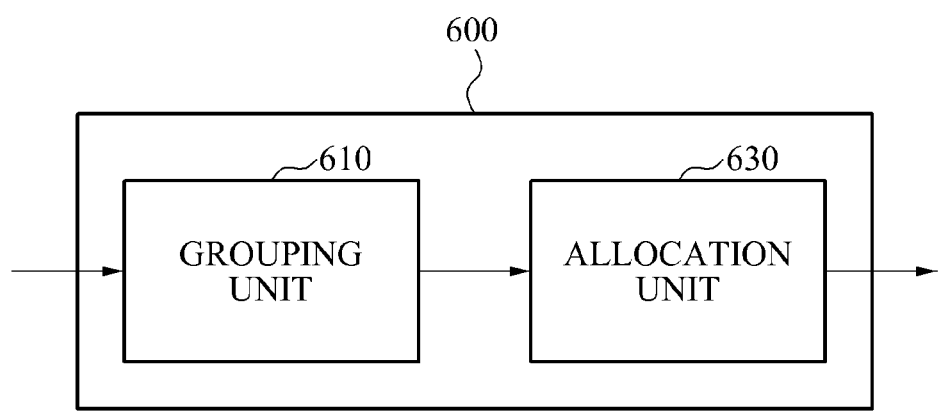
FIG. 6 is a block diagram illustrating an apparatus for managing a backup channel for cognitive radio communication according to an embodiment.

FIG. 6 is a block diagram illustrating an apparatus for managing a backup channel for cognitive radio communication according to an embodiment.

Referring to FIG. 6, an apparatus for managing a backup channel according to an embodiment, hereinafter referred to as the "management apparatus", may include a grouping unit 610, and an allocation unit 630.

The grouping unit 610 may group at least one device included in a cell served by a BS.

The allocation unit 630 may allocate backup channels for cognition radio communication to the groups, based on location information and mobility of the groups grouped by the grouping unit 610.

Here, group types of the groups may be determined to be one of a fixed group without mobility and a mobile group with mobility, based on whether the groups have mobility. Whether the groups have mobility may be determined based on whether hub-devices included in the groups have mobility.

The allocation unit 630 may allocate backup channels for cognitive radio communication to a target group and another group, based on at least one of group types of the target group and the other group, and whether a location of the target group and a location of the other group overlap. For a detailed method by which the allocation unit 630 allocates backup channels to the target group and the other group, the descriptions provided with respect to FIGS. 3 and 4 may be referenced.

The above-described exemplary embodiments of the present invention may be recorded in computer-readable media including program instructions to implement various operations embodied by a computer. The media may also include, alone or in combination with the program instructions, data files, data structures, and the like.

Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. It will be apparent to those skilled in the art that various modifications and variation can be made in the present invention without departing from the spirit or scope of the invention.

Thus, it is intended that the present invention cover the modifications and variations of this invention provided they come within the scope of the appended claims and their equivalents.

The invention claimed is:

1. A method of managing a backup channel for cognitive radio communication, the method comprising:
    grouping devices included in a cell served by a base station into a group, wherein the devices belong to the group as a hub device or a nano device, and wherein nano devices in the group are controlled by the hub device; and
    allocating a backup channel for cognition radio communication to each device of the group, based on mobility and location information of the group,
    wherein a type of the group is determined based on whether or not the group has the mobility, and
    wherein an identical backup channel allocated to a second group included in the cell is allocated to the group, in response to the group and the second group not having the mobility, and a location of the group and a location of the second group not overlapping.

2. The method of claim 1, wherein group types of the group are determined to be one of a fixed group without the mobility and a mobile group with the mobility, based on whether the group has the mobility.

3. The method of claim 1, wherein the allocating comprises allocating backup channels for cognitive radio communication to the group and the second group, based on at least one of group types of the group and the second group, and whether the group and the second group overlap.

4. The method of claim 3, further comprising:
    allocating different backup channels to the group and the second group, when group types of the group and the second group correspond to a fixed group, and a location of the group and a location of the second group overlap.

5. The method of claim 3, further comprising:
    allocating different backup channels to the group and the second group, when at least one of a group type of the group and a group type of the second group corresponds to a mobile group.

6. The method of claim 1, wherein the allocating comprises:
    determining whether an idle channel yet to be allocated to groups included in the cell is present; and
    allocating the idle channel to the group, when the idle channel is present.

7. The method of claim 6, further comprising:
    determining whether a backup channel allocated to a fixed group, among the groups, is present, when the idle channel is absent; and
    allocating, to the group, a backup channel allocated to the fixed group, when the backup channel allocated to the fixed group is present, and a location of the fixed group and a location of another group, among the groups, do not overlap.

8. The method of claim 7, further comprising, in a case in which a backup channel allocated to the fixed group is absent, or in a case in which the location of the fixed group and the location of the group overlap:
    allocating, to the group, a backup channel allocated to a mobile group, when the backup channel allocated to the mobile group, among the groups, is present, and a location of the mobile group and the location of the group do not overlap.

9. The method of claim 8, further comprising:
allocating, to the group, a backup channel allocated to the fixed group or the mobile group, when the location of the mobile group or the location of the fixed group overlaps the location of the group although the backup channel allocated to the fixed group and the mobile group, among the groups, is present.

10. The method of claim 8, further comprising:
allocating, to the group, a backup channel allocated to the base station, when a backup channel allocated to the mobile group is absent.

11. The method of claim 2, further comprising:
updating information about backup channels allocated to the groups included in the cell, when a location of the mobile group is changed or when at least one new group appears in the cell, such that overlapping occurs with respect to the backup channel.

12. The method of claim 1, wherein:
the devices exchange a management message for managing the backup channels, and
the management message comprises at least one of a group identifier (GID) to identify groups served by the base station, a device identifier (DID) for identifying the devices, a location of group (LOG) to which the devices belong, and a type of group (TOG) indicating whether the group has mobility.

13. An apparatus for managing a backup channel for cognition radio communication, the apparatus comprising:
a grouping unit to group devices included in a cell served by a base station into a group, wherein the devices belong to the group as a hub device or a nano device, and wherein nano devices in the group are controlled by the hub device; and
an allocation unit to allocate a backup channel for cognition radio communication to each device of the group, based on mobility and location information of the group,
wherein a type of the group is are determined based on whether or not the group have the mobility, and
wherein an identical backup channel allocated to a second group included in the cell is allocated to the group, in response to the group and the second group not having the mobility, and a location of the group and a location of the second group not overlapping.

14. The apparatus of claim 13, wherein the group types of the group are determined to be one of a fixed group without the mobility and a mobile group with the mobility, based on whether the group has the mobility.

* * * * *